(12) United States Patent
Prairie et al.

(10) Patent No.: US 6,640,732 B2
(45) Date of Patent: Nov. 4, 2003

(54) DISC OPENER ASSEMBLY FOR A SEED PLANTER

(75) Inventors: Douglas S. Prairie, Boise, ID (US); Michael A. Mewes, Fargo, ND (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/045,557

(22) Filed: Mar. 11, 2002

(65) Prior Publication Data

US 2003/0015328 A1 Jan. 23, 2003

Related U.S. Application Data

(62) Division of application No. 09/498,865, filed on Feb. 7, 2000, now Pat. No. 6,386,127.

(51) Int. Cl.$^7$ .......................... A01B 15/16; A01B 23/06; A01C 5/06
(52) U.S. Cl. .................. 111/167; 111/193; 172/566; 172/610
(58) Field of Search ............................. 172/566, 558, 172/610, 547, 559–565; 111/167, 168, 149, 17, 163, 164, 192, 193

(56) References Cited

U.S. PATENT DOCUMENTS

| | | | | |
|---|---|---|---|---|
| 827,375 A | * | 7/1906 | Kennedy et al. | |
| 875,166 A | * | 12/1907 | Fell | |
| 935,297 A | * | 9/1909 | Clevenger | |
| 1,298,209 A | * | 3/1919 | Heylman | |
| 1,561,396 A | * | 11/1925 | Barnes | |
| 1,721,876 A | * | 7/1929 | Davis et al. | |
| 1,723,705 A | * | 8/1929 | Packer | |
| 1,726,278 A | * | 8/1929 | Strandlund | |
| 1,748,308 A | * | 2/1930 | Richard | |
| 2,901,049 A | * | 8/1959 | De Haai | |
| 3,901,740 A | * | 8/1975 | Anderson et al. | 148/16.6 |
| 4,008,770 A | * | 2/1977 | Boone et al. | 172/566 |
| 4,034,688 A | * | 7/1977 | Ernst | 111/87 |
| 4,113,030 A | * | 9/1978 | Walker | 172/566 |
| 4,264,380 A | * | 4/1981 | Rose et al. | 148/16.6 |
| 4,330,041 A | | 5/1982 | Ankenman | 172/566 |
| 4,386,973 A | * | 6/1983 | Kawka et al. | 148/16.5 |
| 4,779,301 A | * | 10/1988 | Millette | 15/105 |
| 5,269,380 A | * | 12/1993 | Lofquist et al. | 172/558 |
| 5,302,215 A | * | 4/1994 | Pfaffmann | 148/567 |
| 5,507,351 A | * | 4/1996 | Martin | 172/558 |
| 5,851,313 A | * | 12/1998 | Milam | 148/222 |
| 5,855,505 A | * | 1/1999 | Letts | 451/523 |
| 5,855,531 A | * | 1/1999 | Mitamura et al. | 476/46 |
| 6,024,179 A | * | 2/2000 | Bourgault | 172/566 |
| 6,237,696 B1 | * | 5/2001 | Mayerle | 172/558 |

* cited by examiner

Primary Examiner—Christopher J. Novosad
(74) Attorney, Agent, or Firm—Rebecca Henkel

(57) ABSTRACT

The present disc opener assembly for a seed planter is for a single disc opener arrangement and is embodied in several embodiments. FIGS. 1 and 1a illustrate two embodiments of the present disc opener assembly the specifics of each will be described below. Referring now to FIGS. 1, 1a and 2, there is illustrated a disc opener assembly (10) mounted on a tool bar (7) connected to a work vehicle (5) for opening a seed trench (8) in the ground upon which the vehicle (5) moves. A main arm (12) is attached to the tool bar (7) with a disc (14) mounted for rotation on the main arm (12). A depth adjustment mechanism (40) is used to adjust the depth of the disc (14) in the seed trench (8) with a seed placement device (70) positioned in the seed trench (8) for depositing a seed (71) in the seed trench (8). The seed trench (8) having been opened by the disc (14) as the work vehicle (5) moves across the ground.

11 Claims, 17 Drawing Sheets

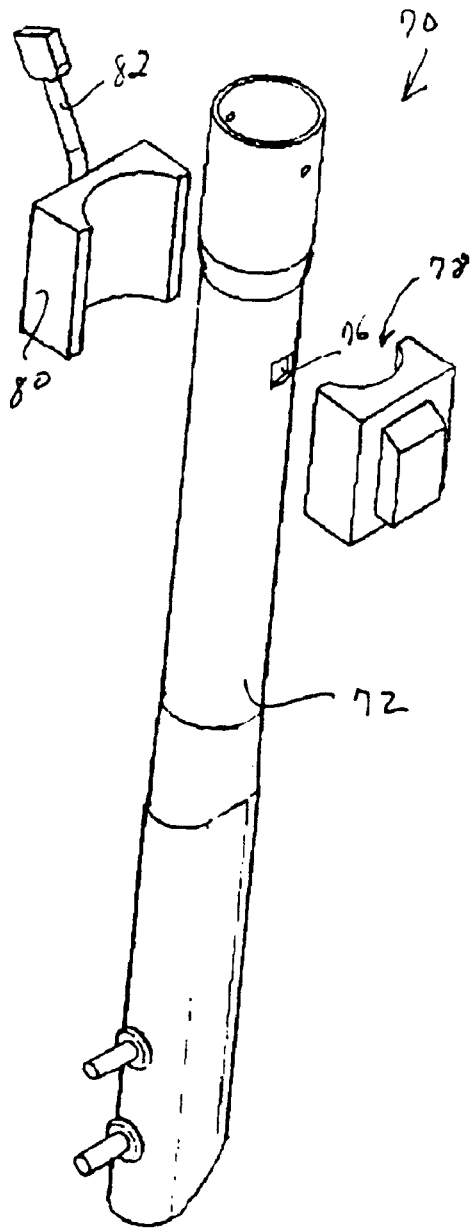
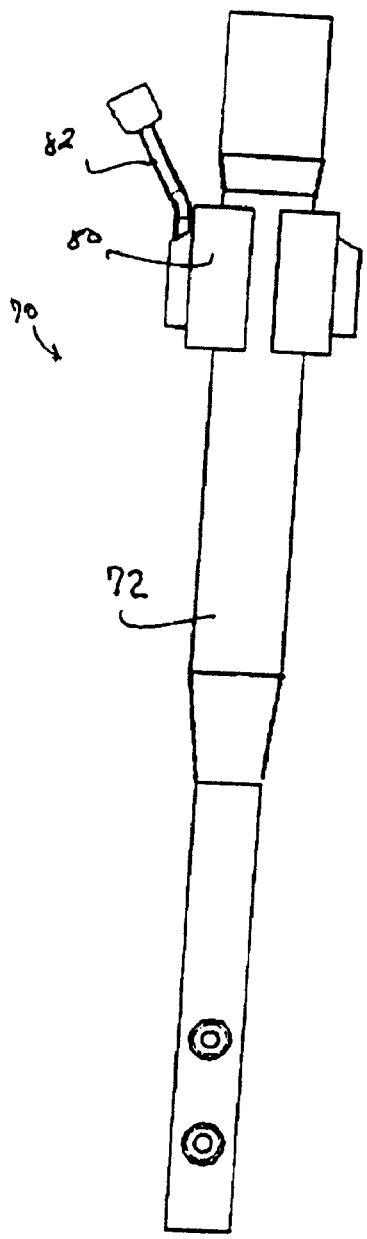
Fig-11c
Fig-11d

DISC OPENER ASSEMBLY FOR A SEED PLANTER

CROSS-REFERENCE TO RELATED APPLICATIONS

This application is a divisional of patent application Ser. No. 09/498,865, filed Feb. 7, 2000, for DISC OPENER ASSEMBLY FOR A SEED PLANTER, now U.S. Pat. No. 6,386,127.

FIELD OF THE INVENTION

This invention relates generally to agricultural planting equipment and more particularly to a disc opener assembly for a seed planter.

BACKGROUND OF THE INVENTION

The efficient production of crops requires that seed be planted in various and selective manners that depend upon the type of seed, the soil conditions and the location. The seed planter must be capable of opening a seed trench at a selected depth, accurately space the seeds apart in the seed trench, cover the seed with an appropriate amount of soil and assure that the seed is in proper contact with the soil.

Existing seed planters utilize various adjustment to control the depth of the seed trench, which usually entails the raising or lowering a gauge wheel which, through linkages, raise or lower the discs used to open the seed trench. The closing of the seed trench on existing seed planters utilize a series of wheels to introduce soil into the seed trench and compact the soil over the seed in the trench.

For depth control, some existing seed planters have poorly located depth adjustments. Some require an operator to apply opposing forces, such as lift a handle while at the same time push the handle forward on backward. Some seed planters require the operator to use two hands to adjust the depth of the opening disc. Other seed planters utilize a threaded shaft which is slow to adjust and have a tendency to seize up due to rusty threaded shafts or become bound up due to an accumulation of dirt.

For adjusting the location of the packer wheel, the wheel that closes the seed trench and compacts the sail over the seed, existing seed planters use a threaded shaft for moving the packer toward or away from the seed trench. Such apparatus has a tendency to seize up due to rusty threaded shafts or they become bound up due to an accumulation of dirt. Some seed planters provide no adjustment for the position of the packer wheel. Some seed planters provide fixed shaft with a pivoting wheel. Such apparatus has an area of influence limited to the radius of the pivot.

For cleaning the opening disc, existing seed planters use a scraper mounted on the apparatus for the purpose of removing soil from the disc. Such scrapers are usually rigidly mounted and because less effective as the scraper edge wears and thus becomes more removed from the disc.

Thus, there is a continuing need for a seed planter disc opener assembly that provides a depth control that is conveniently located, can be operated with one hand and can quickly verify the depth setting of the disc. There is also a need for a packer wheel adjustment that allows adjustment in different crop and seeding conditions and allows packing of the seed trench to be accomplished from over the top of the trench or from the side, at various distances, of the trench. There is a further need for a disc scraper that self-aligns with the disc and maintains contact with the disc as the scraper edge wears.

SUMMARY OF THE INVENTION

The present invention provides a disc opener assembly mounted on a tool bar connected to a work vehicle for opening a seed trench in the ground upon which the vehicle moves. The disc opener assembly comprises a main arm which is attached to the tool bar, with a disc mounted for rotation on the main arm. A depth adjustment mechanism is operatively mounted on the main arm with a seed placement device located behind the disc to deposit a seed in the seed trench opened by the disc. The depth adjustment mechanism comprises a gauge wheel mounted for rotation on one end of a gauge wheel arm, with an opposite end of the gauge wheel arm attached to a gauge wheel pivot. The depth gauge bracket has an arcuate, elongated slot in which a depth adjustment pin slidingly moves to maintain a constant arm about the gauge wheel to accurately control the depth of the disc opener assembly. A depth control handle is pivotally mounted on the depth adjustment arm and has slots corresponding to bracket teeth on the depth gauge bracket. The handle slots are maintained in engagement with the bracket teeth by a spring mounted between the handle and the depth adjustment arm. Precise, incremented, readily verifiable adjustment of the depth of the disc can be accomplished conveniently and with one hand of the operator. The packer wheel lateral placement is accomplished by the packer wheel being rotatably mounted on an axle, with the axle having a plurality of through bores. The axle is slidingly installed in a position tube having a position hole. A position pin engages the position hole and an aligned through bore in the axle corresponding to a selected position of the packer wheel relative to the seed trench. The disc opener assembly is also provided with a seed placement device comprising a hollow seed tube having at least one sensor hole opening into the interior of the seed tube. A seed sensor is aligned with the sensor hole by a seed sensor mounting device attached to the seed tube and the seed sensor monitoring the flow of seed from a seed receptacle through the seed tube to the seed trench. A seed sensor monitor flow signal is conveyed to the work vehicle, typically displayed in the cab of the work vehicle.

An embodiment of the disc opener assembly has a self-aligning disc scraper comprising a planar member having an edge with the edge aligned and in close proximity to a disc of the disc opener assembly. The planar member is attached to the disc opener assembly with fastener that provide a fulcrum for the planar member to pivot toward the disc. A spring member may also be mounted between the planar member and the disc opener assembly to bias the planar member toward the disc. The planar member and the edge of the planar member may be case hardened by a gas nitriding process. The edge of the planar member may also be separate and removably mounted to the planar member.

Other features and advantages of the present invention will become apparent in the following detailed description, appended drawing and accompanying claims.

BRIEF DESCRIPTION OF THE DRAWINGS

FIG. 11b is an exploded side elevation view of the seed tube and seed sensor illustrated in FIG. 11a.

FIG. 11c is a perspective view of an examplary embodiment of a seed tube and seed sensor.

FIG. 11d is a plan view of the seed tube and seed sensor illustrated in FIG. 11c.

Figure 1:
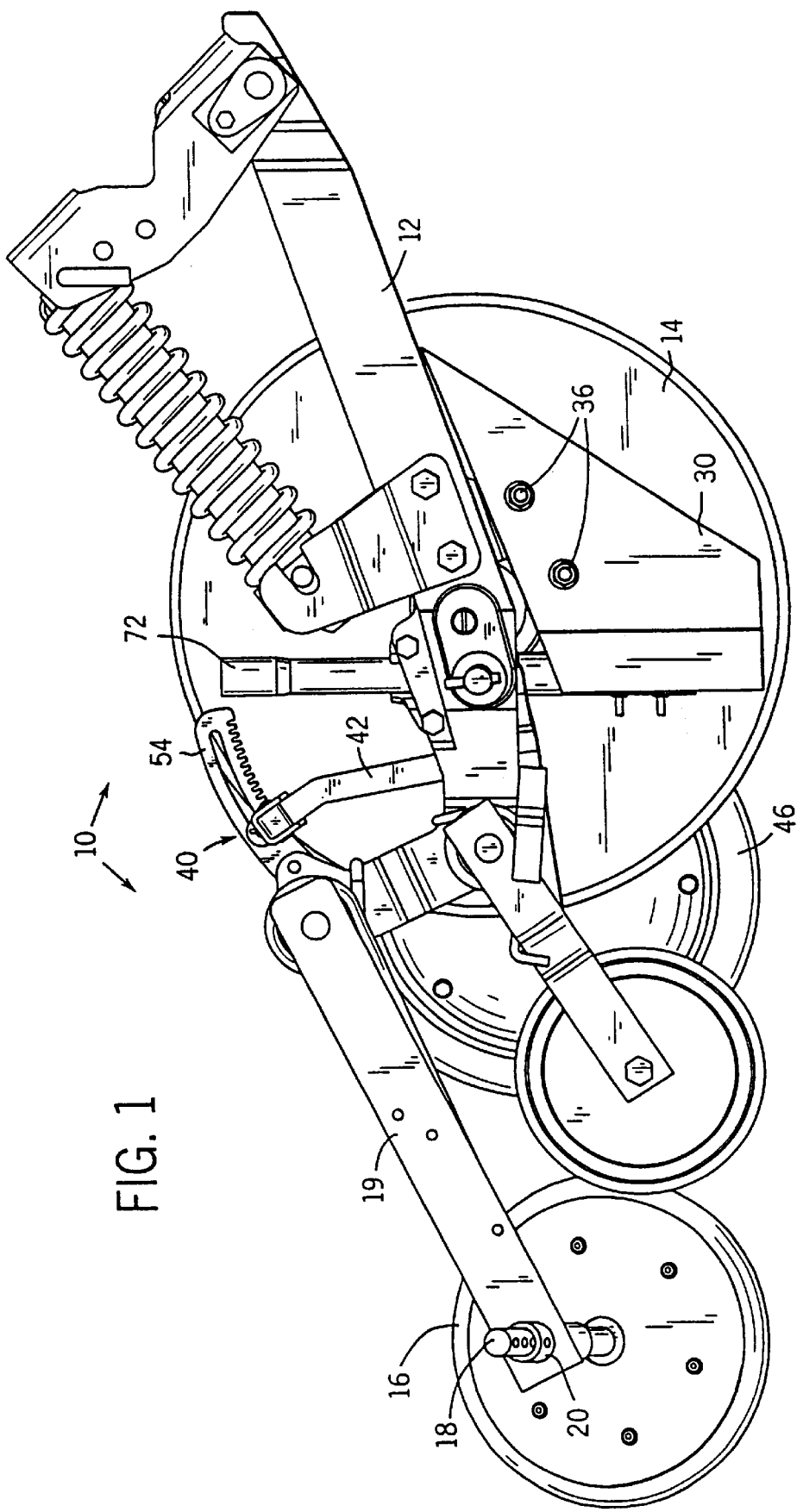
FIG. 1 is a side elevation of a seed planter disc opener assembly.

Before explaining the preferred embodiment of the invention in detail, it is to be understood that the invention is not limited in the application to the details of construction and the arrangement of components set forth in the following description or as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 12:
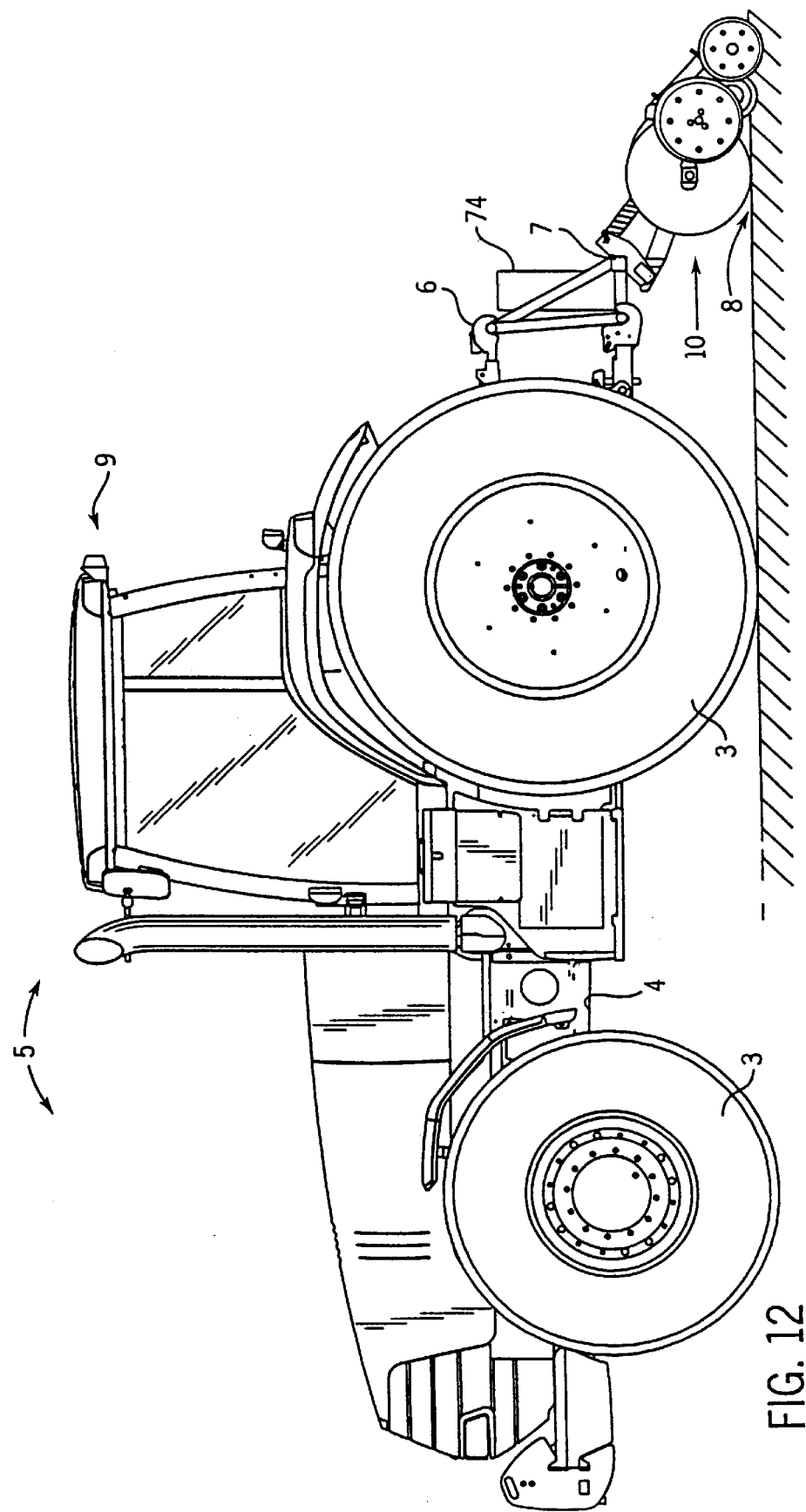
FIG. 12 is a side elevation view of a disc opener assembly mounted on a tool bar coupled to a work vehicle.

Referring now to FIG. 12 of the drawings there is shown a work vehicle (5) having a vehicle support structure (4) to which a plurality of wheels (3) are rotatably mounted. Although a four wheel work vehicle is illustrated, it should be understood that a 6 or 8 wheel vehicle is contemplated as well as a tracked vehicle, with the tracks being supported by wheels. A work vehicle (5) typically has a power source coupled to a transmission with the transmission operatively coupled to at least two of the wheels (3). The power source can be an internal combustion engine such as a gasoline engine or a diesel engine and it may also be an electric motor or a steam driven turbine.

Figure 1A:
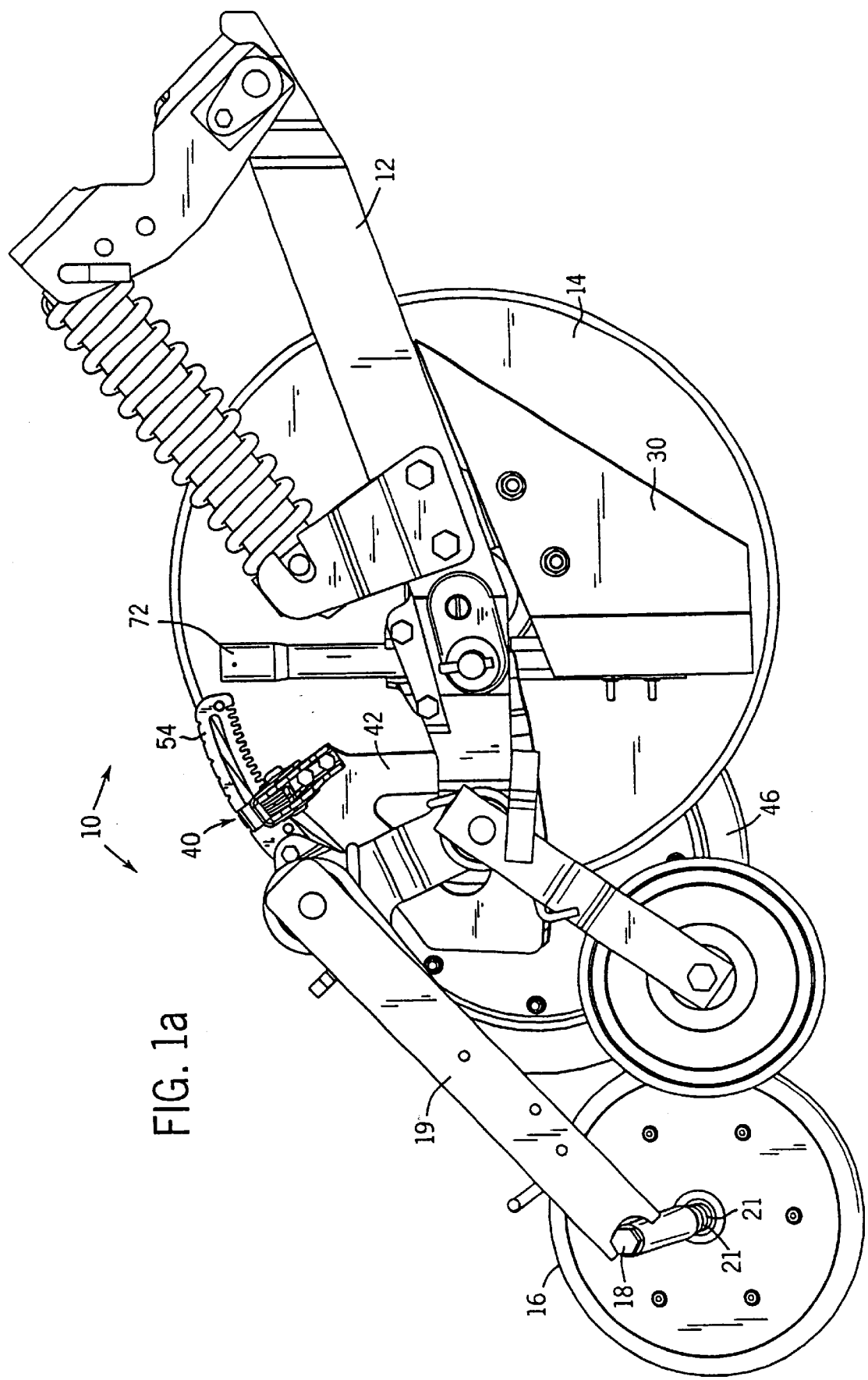
FIG. 1a is a side elevation of an alternative embodiment of a seed planter disc opener assembly.
Figure 2:
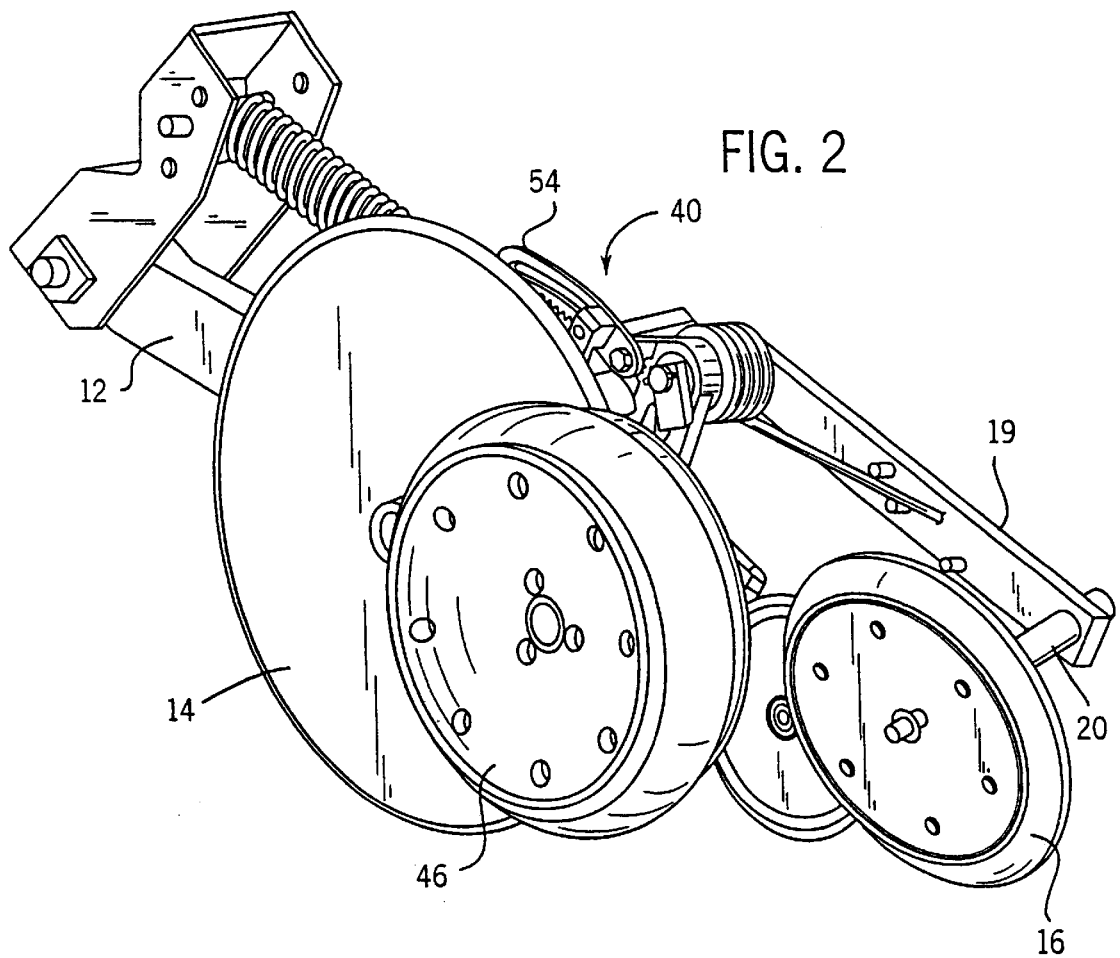
FIG. 2 is a perspective view from the rear of the disc opener illustrated in FIG. 1.

The present disc opener assembly for a seed planter is for a single disc opener arrangement and is illustrated in several embodiments. FIGS. 1 and 1a illustrate two embodiments of the present disc opener assembly (10), the specifics of each will be described below. Referring now to FIGS. 1, 1a and 2, there is illustrated a disc opener assembly (10) mounted on a tool bar (7) connected to a work vehicle (5) for opening a seed trench (8) in the ground upon which the vehicle (5) moves. A main arm (12) is attached to the tool bar (7) with a disc (14) mounted for rotation on the main arm (12). A depth adjustment mechanism (40) is used to adjust the depth of the disc (14) in the seed trench (8) with a seed placement device (70) positioned in the seed trench (8) for depositing a seed (71) in the seed trench (8). The seed trench (8) is opened by the disc (14) as the work vehicle (5) moves across the ground. See FIG. 12.

Figure 5:
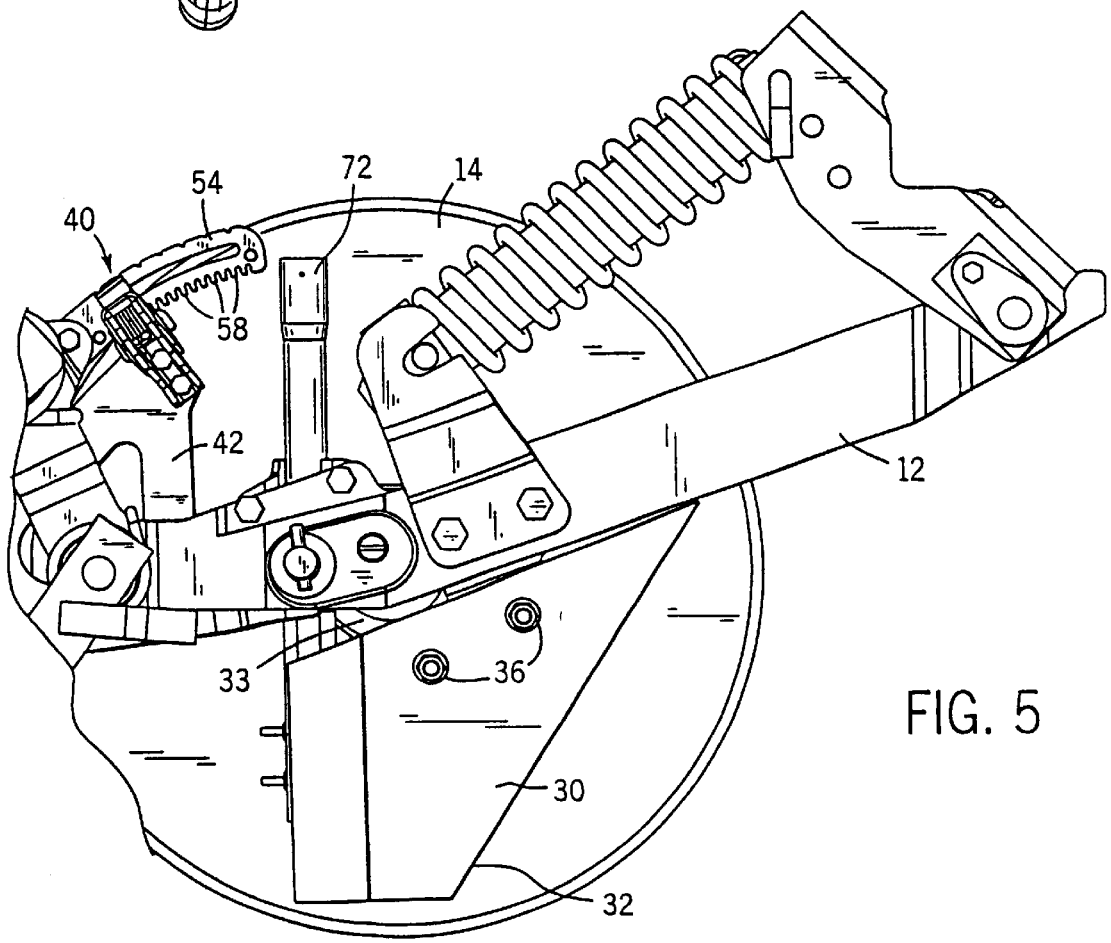
FIG. 5 is a partial side elevation view of disc scraper mounted on a scraper mount attached below the main arm and aligned with the disc to clean the disc.
Figure 6:
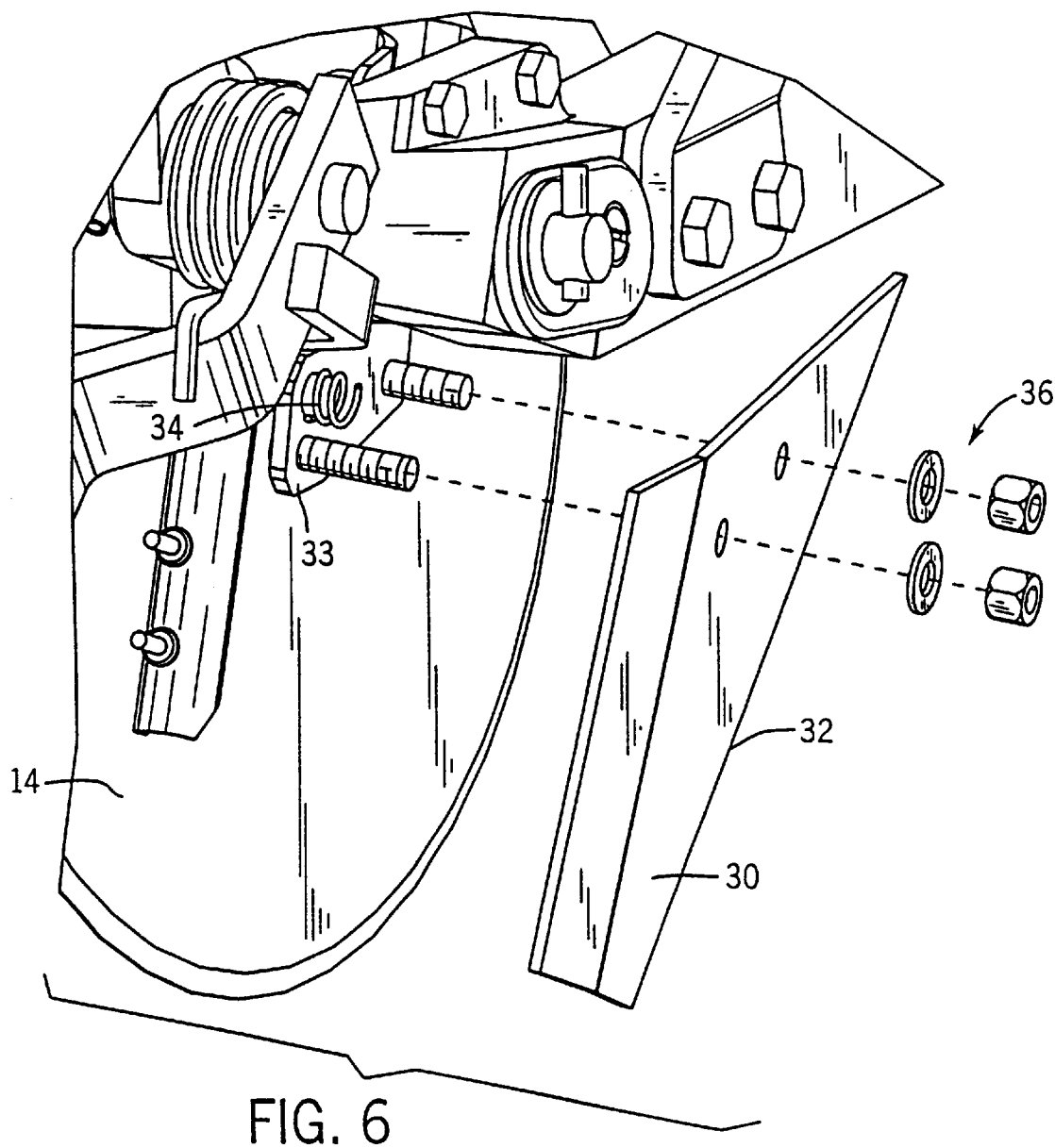
FIG. 6 is an exploded perspective view of the disc scraper.

The disc opener assembly (10) is provided with a disc scraper (30) mounted on the scraper mount (33) attached below the main arm (12) and aligned with the disc (14) to clean the disc. See FIGS. 5 and 6. The disc scraper (30) is a planar member with at least one edge (32) which is aligned with the disc (14) and contacts the disc to clean dirt and plant debris from the disc (14) as the disc is rotated. The disc scraper (30) is attached to the scraper mount (33) by fasteners or other convenient and conventional means of mounting. The preferred embodiment provides for two retainers (36) biased by a spring (34) sandwiched between the scraper (30) and the scraper mount (33) to allow the scraper (30) to pivot about the retainers (36) and self-align with the disc (14). As the edge (32) of the scraper wears down, the spring (34) continues to press the scraper (30) against the disc (14) without any additional intervention by an operator of the disc opener assembly (10). In addition to cleaning the disc, the disc scraper (30) also functions to protect the seed placement device (70) and it helps the disc (14) to create the seed trench (8). The disc scraper (30) typically is made from steel which has been case hardened by a gas nitrating process which gives the scraper (30) a high surface hardness and increases wear resistance. However, the disc scraper (30) may be made from any other material that will resist wear as the scraper edge (32) contacts the disc (14). It is also contemplated that the scraper (30) may be a planar member made of material different from the edge of the scraper (32). For instance, the scraper can be formed from a plastic with the edge (32) being made from steel which is fastened to the disc scraper (30). The plastic planar member providing a degree of resiliency in conjunction with the spring (34) and the steel edge (32) providing the benefits of the all steel scraper described above.

Figure 3:
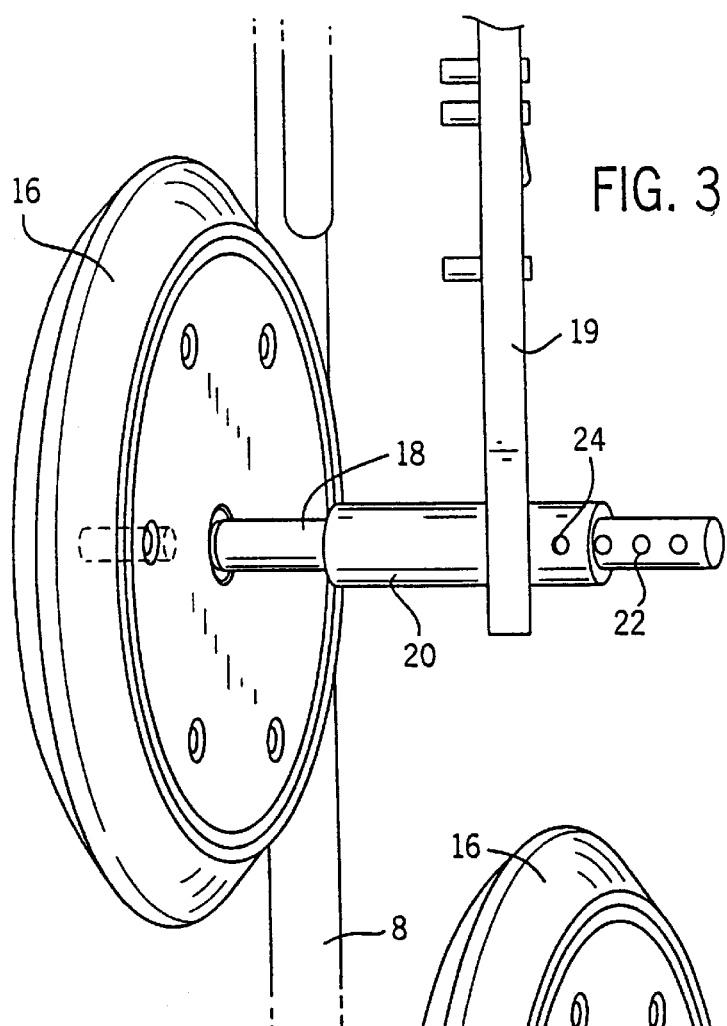
FIG. 3 is a partial top perspective view of the packer wheel positioned over a seed trench.
Figure 4:
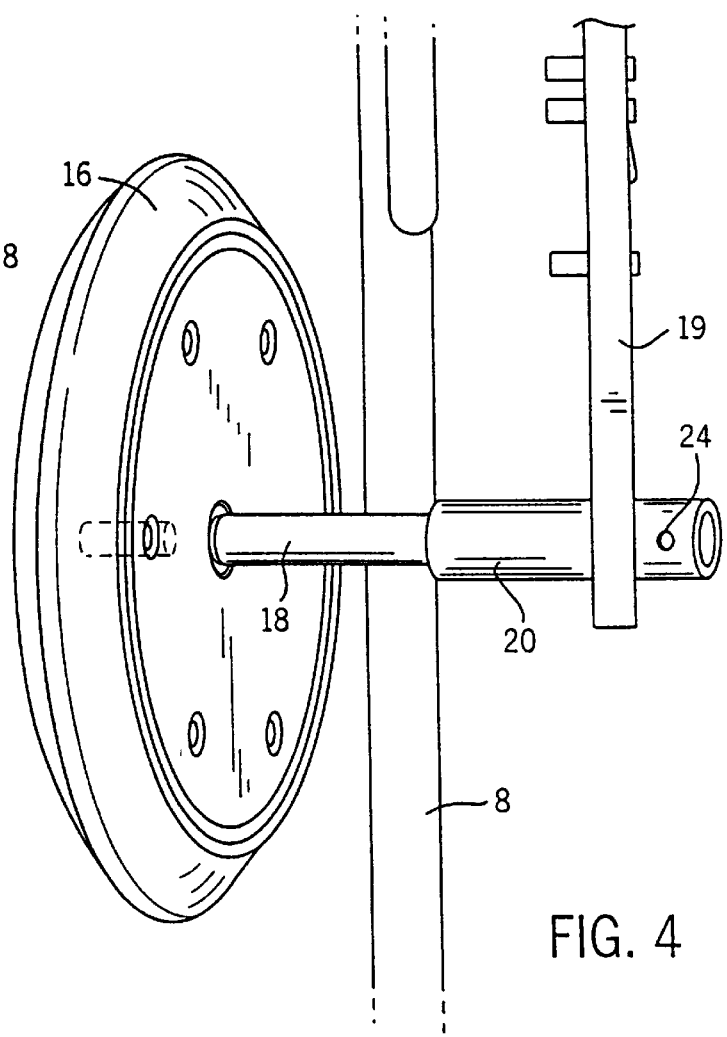
FIG. 4 is a partial top perspective view of the packer wheel positioned to one side of a seed trench.
Figure 4A:
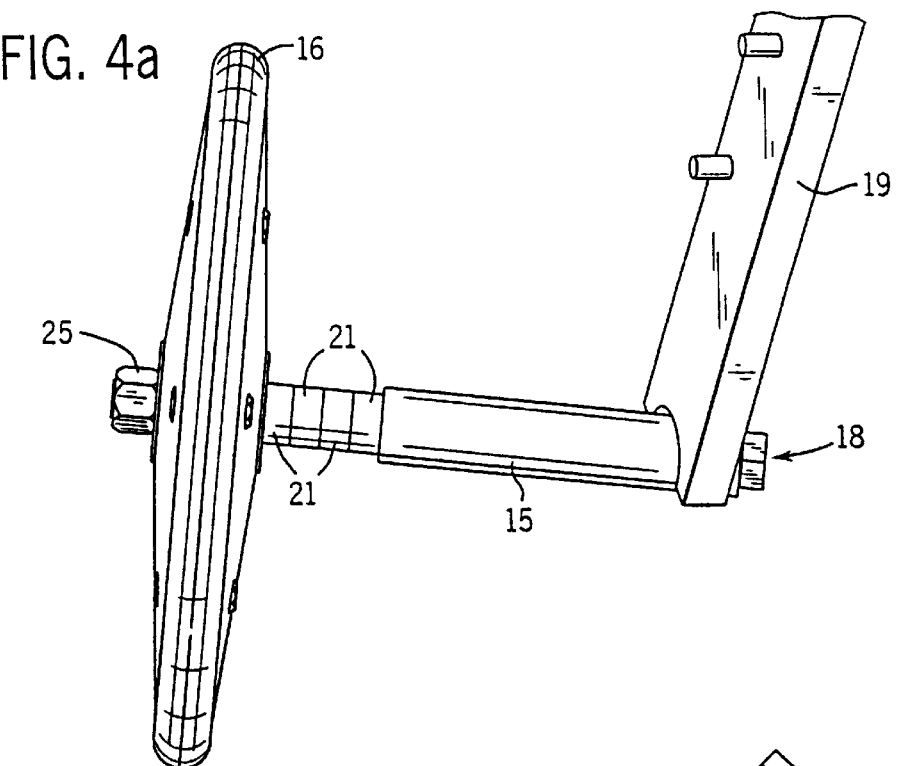
FIG. 4a is a partial top perspective view of an alternative embodiment of the packer wheel.

The disc opener assembly (10) also includes a packer wheel (16) rotably mounted on an axle (18) having a plurality of throughbores (22) with the axle (18) slidingly installed in a position tube (20) having a position hole (23). The position tube (20) is attached to a packer wheel arm (19) connected to the main arm (12) and having a position pin (24) engaging the position hole (23) and an aligned throughbore (22) in the axle (18) corresponding to a selected position of the packer wheel (16) relative to the seed trench (18). See FIGS. 3 and 4. As the disc opener assembly (10) moves through the field opening a seed trench (8), the packer wheel (22) closes the seed trench (8). The distance of the packer wheel 22) away from the seed trench (8) determines the amount of soil deposited into the seed trench (8) during the closing operation and the compaction of the soil on the seed (71) in the trench. An alternative embodiment of the packer wheel (22) is illustrated in FIG. 4a. The lateral position of the packer wheel (16) is established by a plurality of spacers (21) slidingly mounted on the packer wheel axle (18) between an axle bushing (15) and the packer wheel (16). The axle bushing (15) is attached to the packer wheel arm (19). The packer wheel (16) and spacers (21) are maintained on the packer wheel axle (18) by a retainer (25). The packer wheel axle (18) is mounted in the axle bushing (15). An operator of the disc opener assembly (18) can adjust the lateral distance of the packer wheel with respect to the seed trench (18) by adding or removing spacers (21) from the packer wheel axle (18) as the planting conditions change from time to time.

Figure 7:
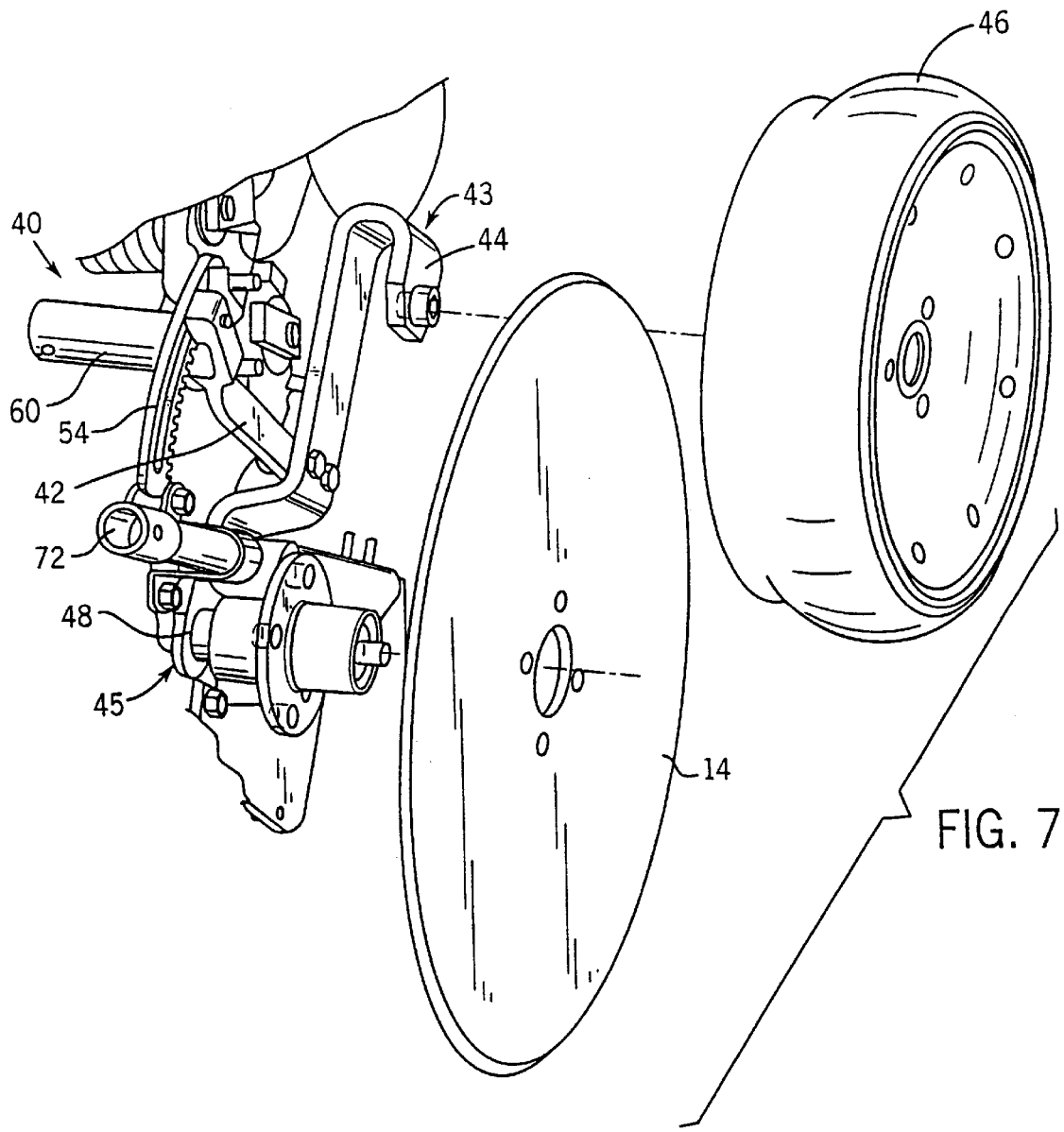
FIG. 7 is a partial top perspective view of the depth adjustment mechanism, with the disc and gauge wheel set apart from the mechanism.
Figure 8:
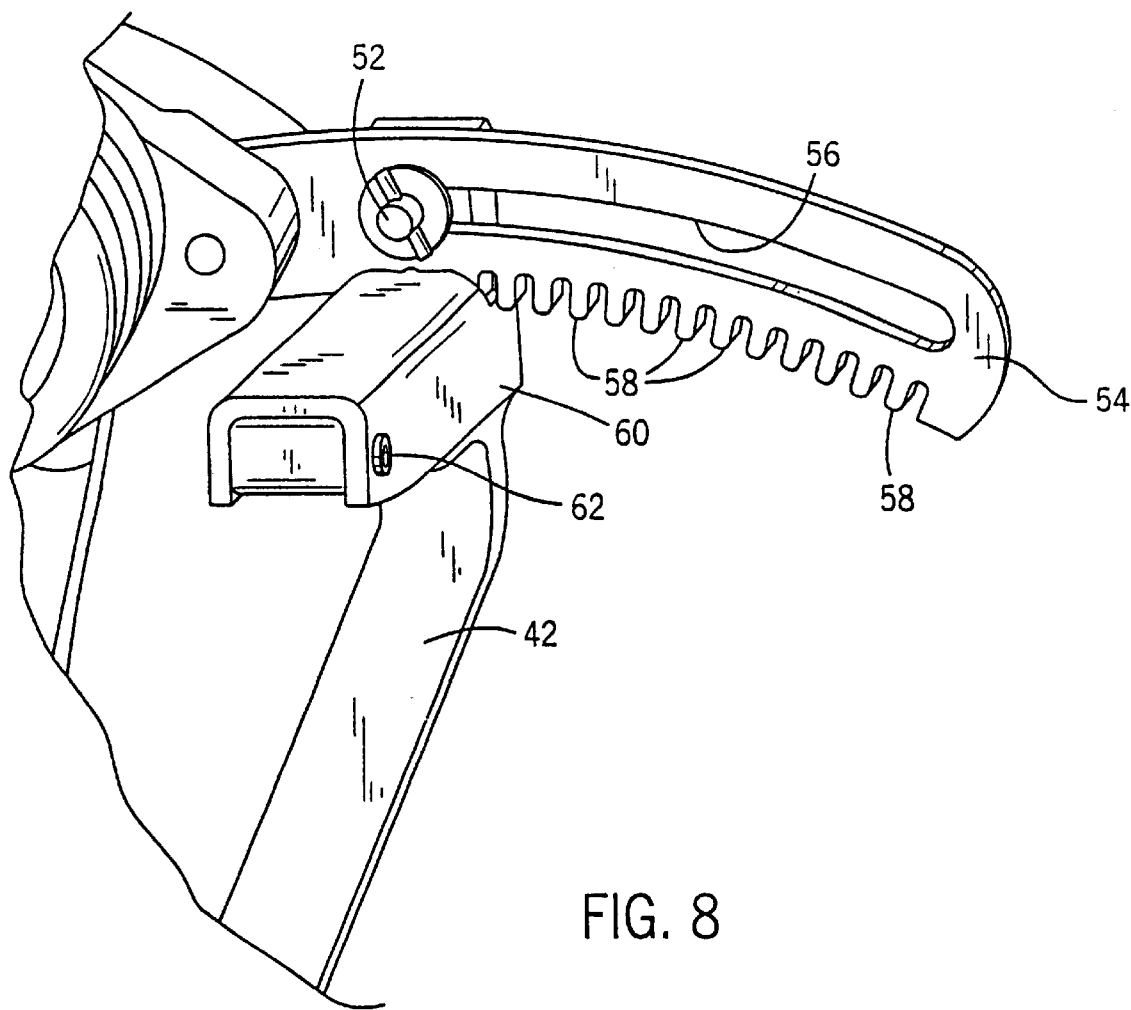
FIG. 8 is a partial perspective view of a depth adjustment handle engaged with bracket teeth of a depth adjustment bracket and showing the depth adjustment pin at one end of an arcuate, elongated bracket slot.
Figure 9:
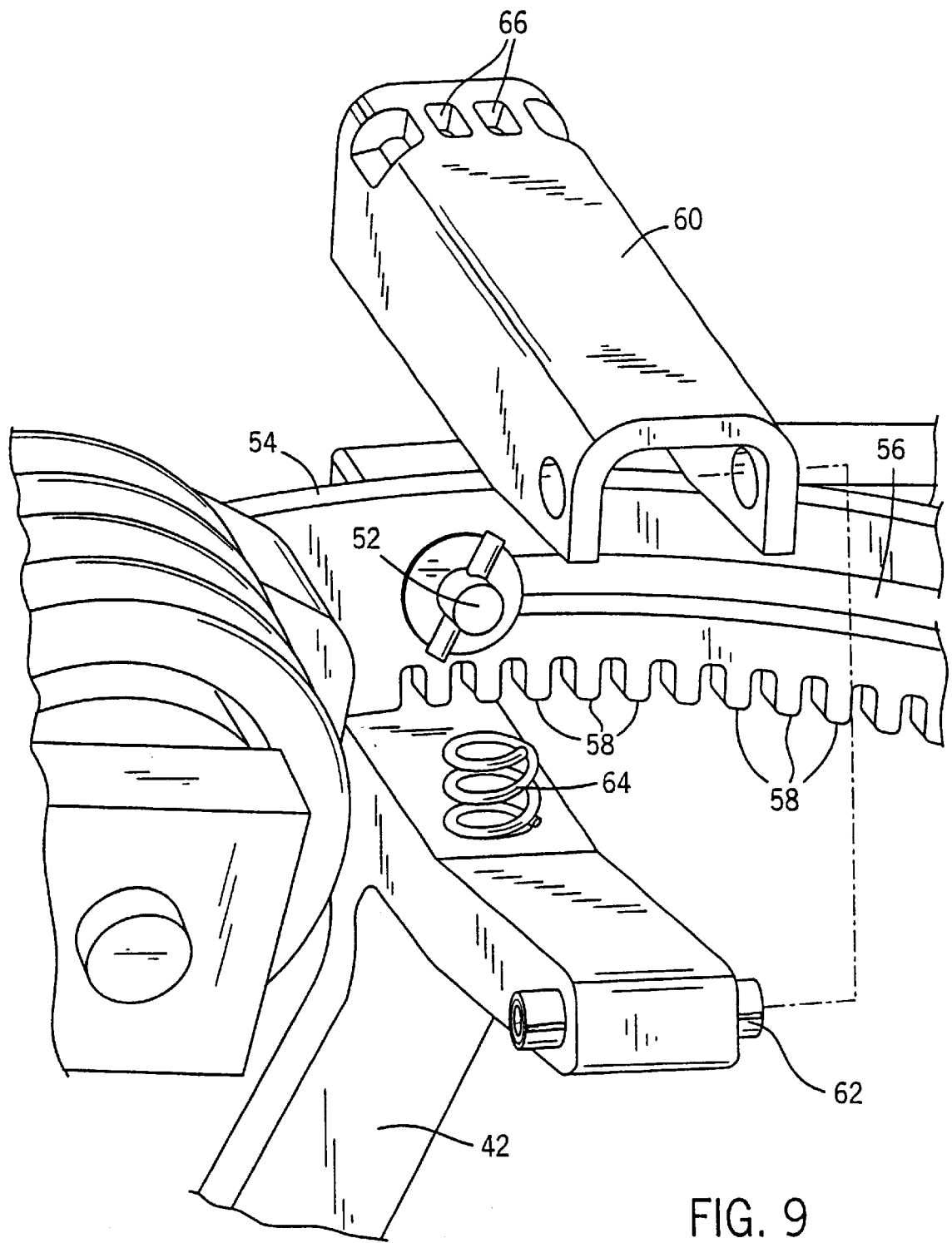
FIG. 9 is a partial perspective view of the depth adjustment handle set apart from the depth adjustment arm to display a handle spring and the handle slots that engage the bracket teeth.

The disc opener assembly (10) has a depth adjustment mechanism (40). A gauge wheel (46) is mounted for rotation on one end (43) of a gauge wheel arm (44) with an opposite end (45) of the gauge wheel arm (44) being attached to a gauge wheel pivot (48). The gauge wheel (46) can be made from composite elements, such as a tire rim formed from metal or plastic, connected by a suitable fastener and having a semi-pneumatic tire disposed about its periphery. The semi-pneumatic tire helps reduce side-wall compaction of the seed trench (8) while allowing the gauge wheel (46) to move toward and away from the ground as the depth adjustment mechanism (40) is operated, thereby adjusting the depth of the disc (14) as more fully described below. A depth gauge bracket (54) is engaged with a depth adjustment arm (42). The depth gauge bracket (54) is provided with an arcuate, elongated slot (56). The depth adjustment arm (42) has a depth adjustment pin (52) slidingly engaged in the elongated slot (56) with the depth adjustment arm (42) attached to the gauge wheel arm (44) so that the pin (52) maintains a constant arc (50) about the gauge wheel pivot (48) as the pin (52) slides in the arcuate elongated slot (56). A depth adjustment handle (60) is mounted on the depth adjustment arm (42) to engage and disengage the depth adjustment arm (42) in the depth adjustment bracket (54). The depth adjustment handle (60) is pivotably mounted on the depth adjustment arm (42) with the handle (60) having slots (66) corresponding to bracket teeth (58) on the depth gauge bracket (54) with the bracket teeth (58) engaging the slots (66) of the handle (60) as the handle (60) is biased by a handle spring (64) mounted between the handle (60) and the depth adjustment arm (42). See FIGS. 7, 8 and 9.

Figure 8A:
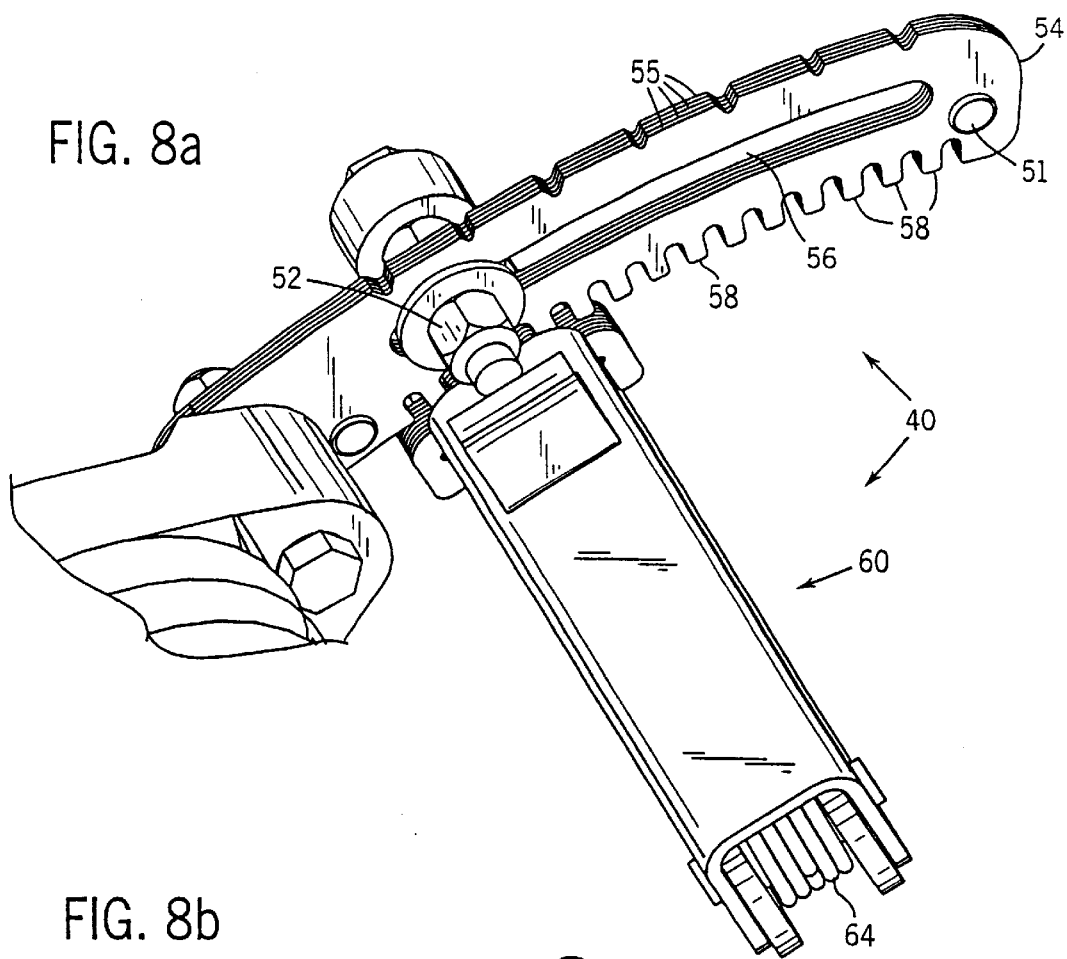
FIG. 8a is a partial perspective top view of an alternative embodiment of a depth adjustment handle engaged with bracket teeth of an alternative embodiment of a depth adjustment bracket.
Figure 8B:
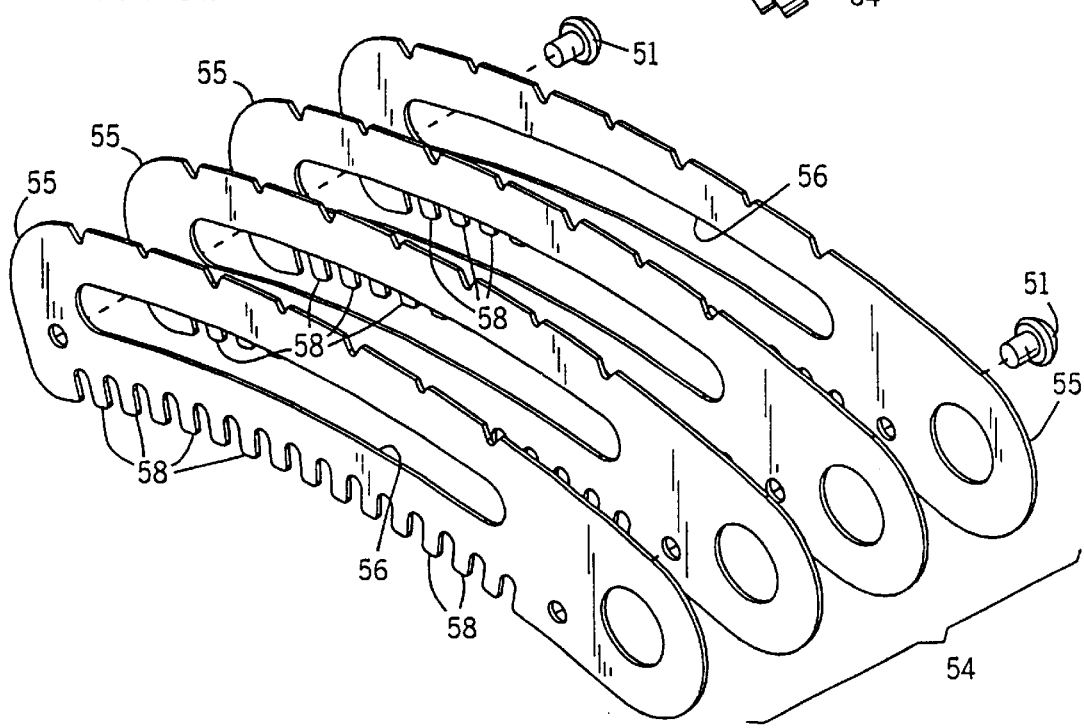
FIG. 8b is an exploded perspective view of a depth adjustment bracket displaying a plurality of bracket laminations.
Figure 9A:
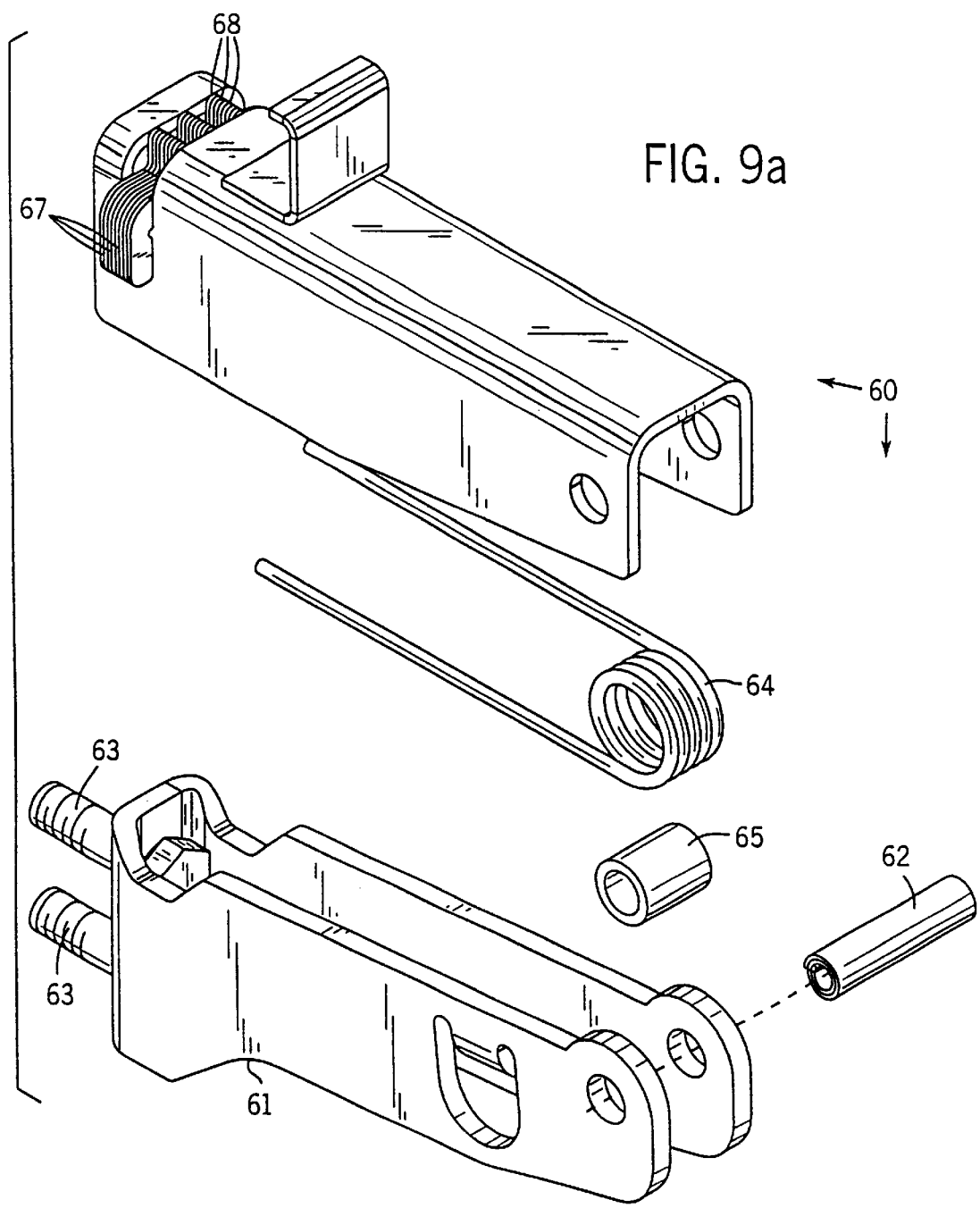
FIG. 9a is an exploded perspective view of an alternative embodiment of a depth adjustment handle.
Figure 9B:
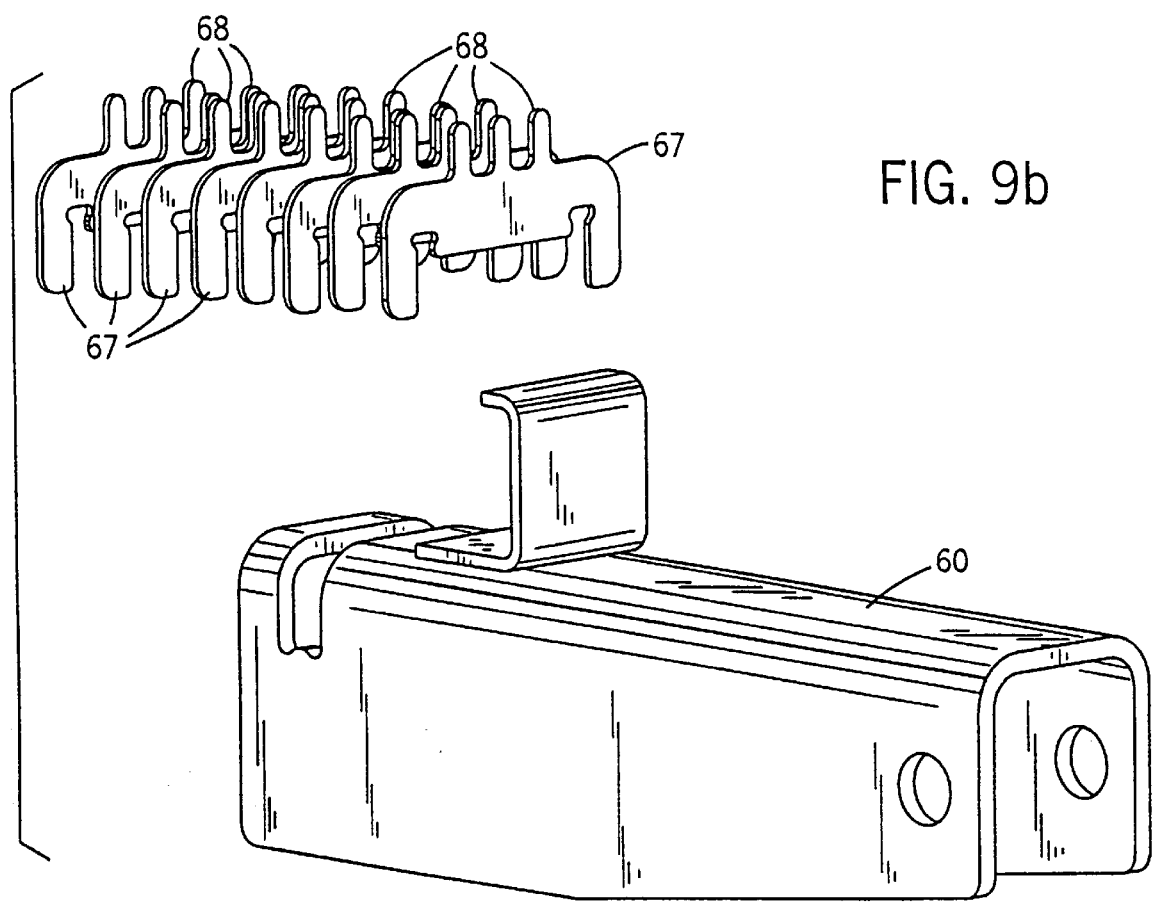
FIG. 9b is a partial perspective view of the depth adjustment handle illustrated in FIG. 9a displaying a plurality of handle teeth laminations.

The depth adjustment bracket (54) can be formed or machined from a solid piece of material, preferably steel. An alternative embodiment of the depth gauge adjustment mechanism (40) provides a depth gauge handle (60) mounted on the depth adjustment arm (42) with the handle (60) having a plurality of layers or laminations (67) laminated together to form handle teeth (68). Each layer or lamination is comprised of a thin high strength, low alloy sheet metal, such as steel, which is stamped to a selected shape. The laminated handle teeth (68) are mounted on the handle (60) with the handle (60) mounted to a handle member (61) by a handle pivot pin (62). A spacer (65) is axlely mounted on the handle pivot pin (62) with a coil spring (64) biasing the handle (60) from the handle member (61). See FIGS. 9a and 9b. The depth gauge bracket (54) is also composed of a plurality of layers with each bracket lamination layer (55) comprising a thin, high strength, low alloy steel sheet metal which is stamped to a selected shape and laminated together to form the depth gauge bracket (54). See FIGS. 8a and 8b. A fastener (51), such as a rivet or nut and bolt, is the preferred embodiment for securing the bracket laminations (55) together. However, it should be understood that any other form of attachment or adhesive suitable to withstand the forces emparted to the depth gauge bracket (54) by the handle (60) in the depth adjustment mechanism (40) can be used. The bracket teeth (58) formed in the bracket laminations (55) are engaged by the handle teeth (68). As an operator compresses the handle (60) against the handle member (61) the handle teeth (68) are disengaged from the bracket teeth (58). The operator moves the handle assembly within the elongated arcuate slot (56) which changes the depth of the disc (14) by moving the gauge wheel (46) mounted on the gauge wheel arm (44). With the depth adjustment mechanism (40), an operator can quickly and efficiently change the depth of the seed trench (8) by changing the setting of the disc (14) in the soil.

Figure 10:
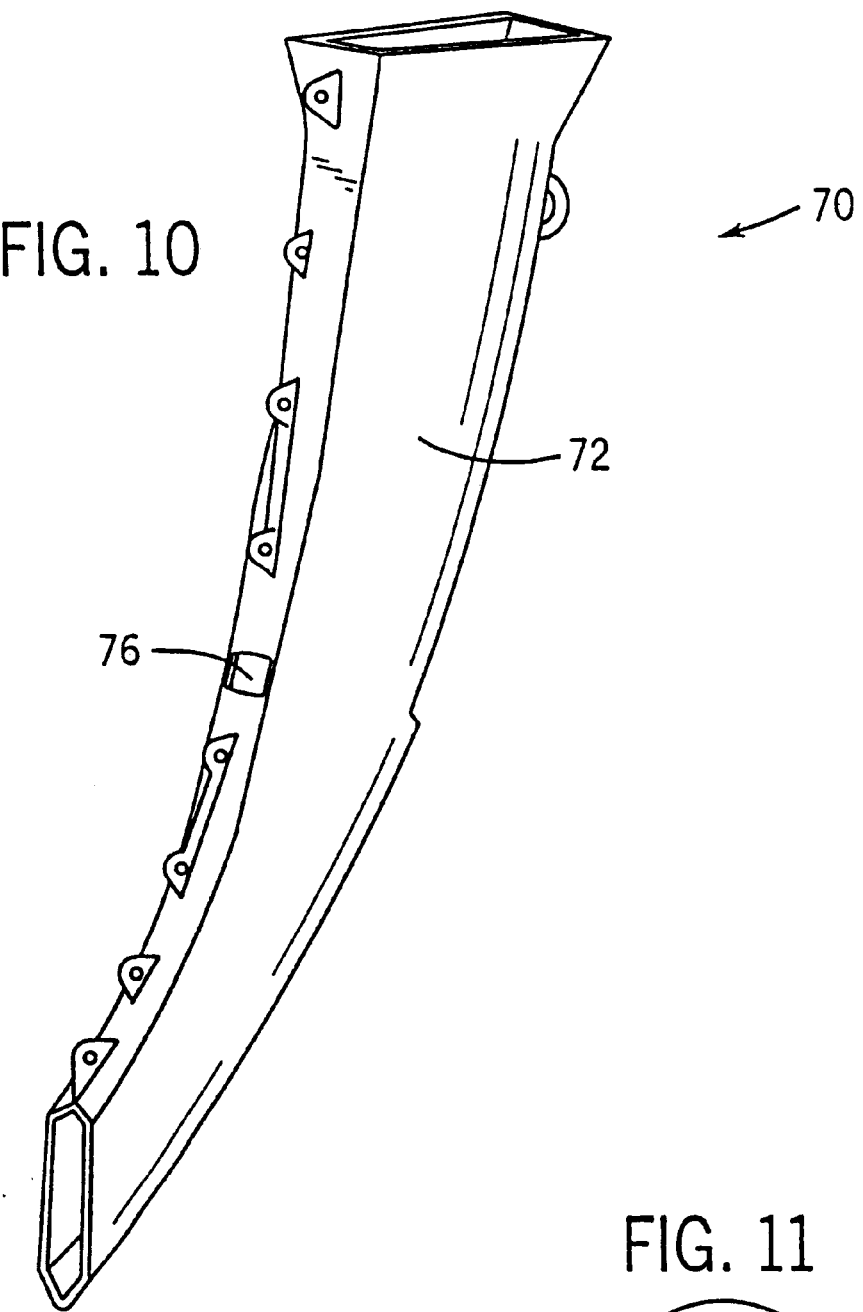
FIG. 10 is a perspective view of a seed tube.
Figure 11:
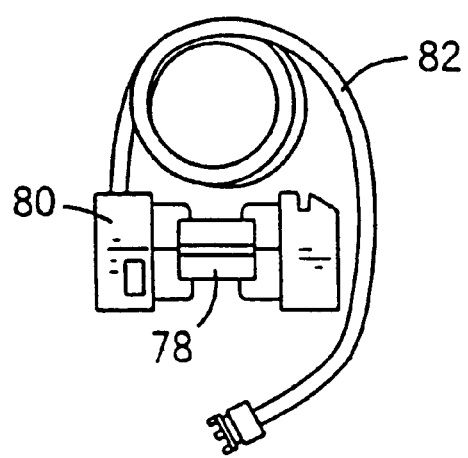
FIG. 11 is a top perspective view of a seed sensor.
Figure 11A:
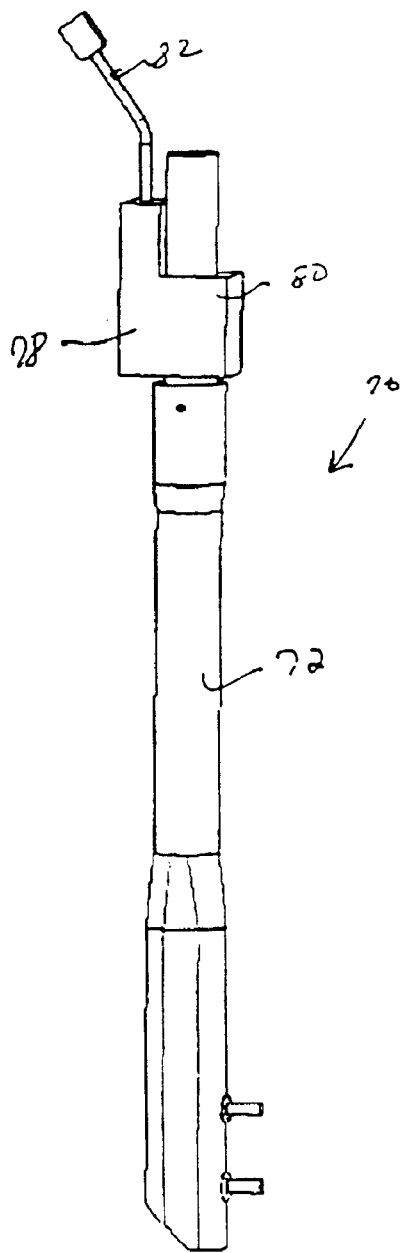
FIG. 11a is a perspective view of an examplary embodiment of a seed tube engaged with a seed sensor.
Figure 11B:
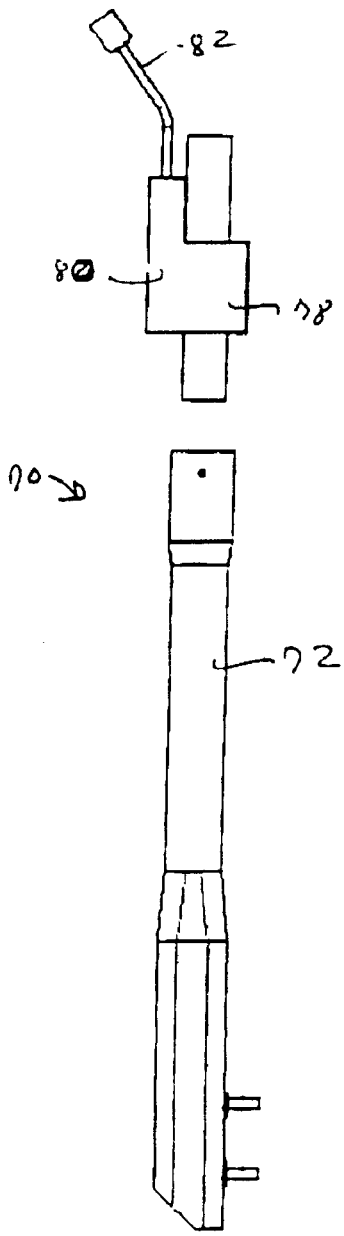

The disc opener assembly (10) is also provided with a seed placement device (70). The seed placement device (70) comprises a hollow seed tube (72) having at least one sensor hole (76) opening into the interior of the seed tube (72) with the seed tube (72) connected to a seed receptacle (74). The seed sensor (78) is maintained in alignment with the sensor hole (76) by a seed sensor mounting device (80) attached to the seed tube (72) and the seed sensor (78) monitoring the flow of seed (71) from the seed receptacle (74) through the seed tube (72) into the seed trench (8). One embodiment provides the sensor hole (76) near the top of the seed tube (72) as shown in FIGS. 11c and 11d. Another embodiment provides for the seed sensor (78) configured to engage the seed tube (72) as shown in FIGS. 11a and 11b. The seed tube (72) can be configured in a substantially straight line as illustrated in FIGS. 1, 1a and, 11a–d or in a curved arrangement as illustrated in FIG. 10.

Figure 10A:
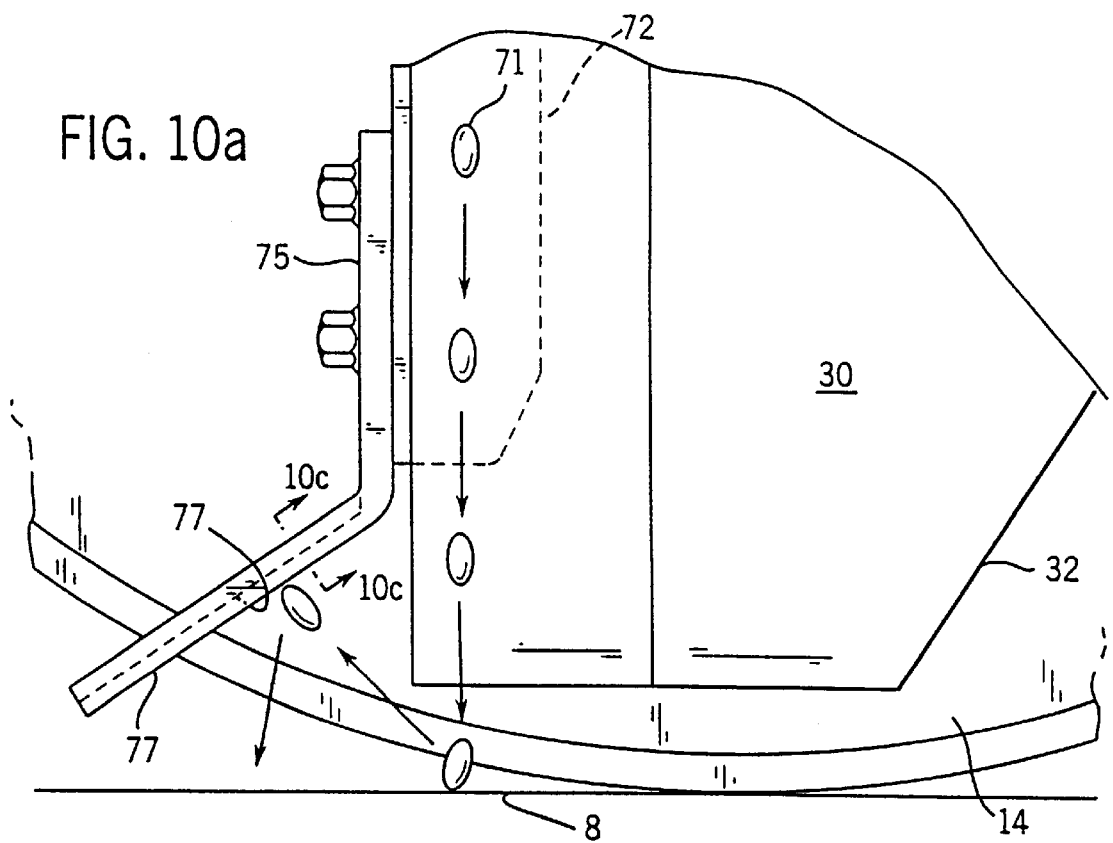
FIG. 10a is a partial side elevation of a seed deflector tab having a deflector portion redirecting a seed towards the seed trench.
Figure 10B:
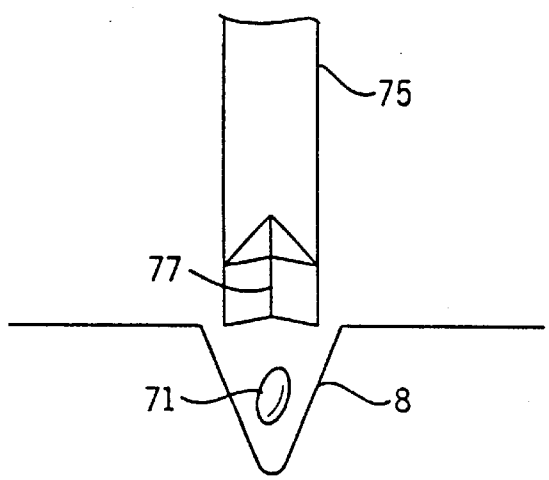
FIG. 10b is a partial end view of the seed deflector tab illustrated in FIG. 10a displaying an inverted V-shape deflector portion.
Figure 10C:
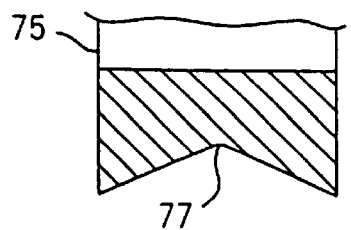
FIG. 10c is a partial cross-section of a deflector portion of a seed deflector tab that has an inverted V-crossed section.

In some applications, the seed (71) flow from the seed receptacle (74) moves through the seed tube (72) at such a velocity that upon the seed hitting the ground in the seed trench (8) the seed (71) rebounds out of the seed trench (8). An embodiment of the present disc opener assembly (10) provides a seed deflector tab (75) having a deflector portion (77) mounted on the seed tube (72). If the seed (71) rebounds or deflects from the seed trench (8), the deflector portion (77) of the seed deflector tab (75) redirects the seed (71) back towards the seed trench (8). See FIGS. 10a, 10b and 10c. The preferred embodiment of the deflector portion (77) of the seed deflector tab (75) has an inverted V-cross section (see FIG. 10c), however it should be understood that the deflector portion (77) can also have a concave radius cross section or can have a rectangular cross section or such other suitable cross section that will deflect a seed (74) back into the seed trench (8).

Thus, there is provided a disc opener assembly mounted on a tool bar connected to a work vehicle for opening a seed trench in the ground upon which the vehicle moves. While several embodiments of the present invention have been disclosed and described in detail herein, various modifications may be made. For example, the preferred embodiment of a work vehicle describes a vehicle having a frame that supports the power source, transmission and wheels. Some vehicle structures such as agricultural tractors don't have a frame as a support structure but use the engine block and transmission housing as part of the support structure for the wheels and axles. By way of further modification, the single disc opener assembly can be ganged with several additional disc openers to work several rows in a field; or the seeds can be placed in the seed trench with an air gun. Such modifications and variations in use are intended to fall within the scope of the appended claims.

What is claimed is:

1. A disc opener assembly mounted on a tool bar connected to a work vehicle for opening a seed trench, the disc opener assembly having a self-aligning disc scraper, the disc scraper comprising:

a planar member having an edge, with the edge aligned and in close proximity to a disc of the disc opener assembly, the planar member attached to the disc opener assembly with at least two fasteners, which fasteners provide a fulcrum for the planar member to pivot toward the disc; and a spring member mounted between disc opener assembly and the planar member to bias the planar member toward the disc, wherein the edge of the planar member is separate and removably mounted to the planar member.

2. The disc scraper of claim 1, wherein the planar member is made from steel which has been case hardened by a gas nitriding process.

3. The disc scraper of claim 1, wherein the edge of the planar member is made from steel which has been case hardened by a gas nitriding process.

4. The disc scraper of claim 1, wherein the spring member is a coil spring that provides a force to bias a portion of the planar member away from the disc, wherein the portion of the planar member is disposed on an opposite side of the fulcrum with respect to the edge.

5. The disc scraper of claim 1, further comprising an axle extending through a central portion of the disc to support rotation of the disc in response to a direction of motion, and wherein the at least two fasteners are disposed forward of the axle with respect to the direction of motion.

6. A work vehicle operating along a direction of motion having a disc opener assembly for opening a seed trench in soil and depositing seeds in the trench, the disc opener assembly comprising:

a disc rotating about an axle that is connected to the vehicle and extends perpendicular to the direction of motion, wherein rotation of the disc opens the seed trench in the soil;

a disc scraping assembly including planar member having an edge, wherein the edge is aligned and in close proximity to a surface of the disc for removing soil from the disc when opening the seed trench; and a seed placement device disposed immediately adjacent and behind the axle with respect to the direction of motion for depositing seeds in the trench, wherein the entire portion of the edge is disposed in front of the axle with respect to the direction of motion.

7. The work vehicle of claim 6, wherein the planar member is attached to the disc opener assembly with at least two fasteners, which fasteners provide a fulcrum for the planar member to pivot toward the disc.

8. The work vehicle of claim 7, further comprising a spring attached at one end to a mounting bracket disposed proximal the axle, and attached at a second end to a portion of the planar member at a location opposite the edge with respect to the fulcrum.

9. The work vehicle of claim 8, the spring biases the portion of the planar member outwardly so as to bias the edge inwardly toward the disc.

10. The work vehicle of claim 8, wherein the fasteners and spring are connected to the opener assembly via the same mounting bracket.

11. The work vehicle of claim 7, wherein the at least two fasteners are attached at a location forward of the axle with respect to the direction of motion.

* * * * *